(12) United States Patent
Han et al.

(10) Patent No.: US 9,337,910 B2
(45) Date of Patent: May 10, 2016

(54) MIMO COMMUNICATION SYSTEM USING PRE-CODER BASED ON TIGHT FRAME

(71) Applicant: KYUNGPOOK NATIONAL UNIVERSITY INDUSTRY-ACADEMIC COOPERATION FOUNDATION, Daegu (KR)

(72) Inventors: Dongseog Han, Daegu (KR); Bonggyun Jo, Daegu (KR)

(73) Assignee: Kyungpook National University Industry—Academic Cooperation Foundation, Daegu (KR)

( * ) Notice: Subject to any disclaimer, the term of this patent is extended or adjusted under 35 U.S.C. 154(b) by 0 days.

(21) Appl. No.: 14/809,447

(22) Filed: Jul. 27, 2015

(65) Prior Publication Data

US 2016/0036502 A1 Feb. 4, 2016

(30) Foreign Application Priority Data

Jul. 30, 2014 (KR) ........................ 10-2014-0097323

(51) Int. Cl.
*H04B 7/02* (2006.01)
*H04B 7/04* (2006.01)
*H04W 84/04* (2009.01)

(52) U.S. Cl.
CPC ............ *H04B 7/0413* (2013.01); *H04B 7/0456* (2013.01); *H04W 84/042* (2013.01)

(58) Field of Classification Search
CPC ...... H04B 7/0452; H04B 7/04; H04B 7/0413; H04B 7/0626; H04B 7/024; H04L 2025/03426; H04L 27/2601; H04L 1/0052; H04L 25/021; H04L 27/00
USPC .......... 375/260, 299, 347; 455/500, 102, 132, 455/103; 370/347, 349
See application file for complete search history.

(56) References Cited

U.S. PATENT DOCUMENTS 8,948,098 B2 * 2/2015 Li ........................ H04B 7/0452
370/252

* cited by examiner

*Primary Examiner* — Rahel Guarino
(74) *Attorney, Agent, or Firm* — IPLA P.A.; James E. Bame

(57) ABSTRACT

Provided is a MIMO communication system using a pre-coder based on a tight frame capable of increasing an amount of transmitted signals and improving reception performance by transmitting and receiving a signal through a tight-frame pre-coder. The transmission device modulates transmission data on the basis of a transmission combination of the transmission antennas and the pre-coder based on the tight frame and transmits the data to the reception device.

16 Claims, 6 Drawing Sheets

MIMO COMMUNICATION SYSTEM USING PRE-CODER BASED ON TIGHT FRAME

CROSS REFERENCE

This application claims foreign priority under Paris Convention to Korean Patent Application No. 10-2014-0097323, filed 30 Jul. 2014, with the Korean Intellectual Property Office.

BACKGROUND OF THE INVENTION

1. Field of the Invention

The present invention relates to a MIMO communication system, and more particularly, to a MIMO communication system using a pre-coder based on a tight frame to increase an amount of transmitted signals and to improve reception performance, by modulating signals through antenna combination and a pre-coder based on a tight frame and transmitting the modulated signal.

2. Description of the Related Art

Recently, mass contents are actively produced according to development of a next generation mobile terminal and a UHDTV (Ultra-High Definition TV). In addition, consumers who consume mass contents are rapidly increasing.

According to such a trend, mobile communication networks based on LTE (Long Term Evolution) and LTE-A (Advanced) using a bandwidth of 20 to 100 MHz and a MIMO (Multi-Input Multi-Output) technique have come into wide use throughout the world.

A MIMO transmission technique used in LTE and LTE-A having a transmission amount of 500 Mbps to 1 Gbps dramatically increases channel capacity using a number of transmission and reception antennas, and is suitable to transmit mass data.

However, the MIMO transmission technique is vulnerable to interference among channels due to interference among reception signals and complicated receiver algorithm, and it is difficult to embody hardware thereof.

Accordingly, a MIMO transmission technique to which antenna combination is coupled has recently been developed. As the MIMO transmission technique to which the antenna combination is coupled, there are two methods of SSK (Space Shift Keying) and SM (Spatial Modulation).

The SSK uses only combination of antennas which transmit information of many transmission antennas. The SSK technique has an advantage that a receiver is simple and there is no interference among reception signals, but an amount of transmission is small since a signal modulation constellation is not used and signals are transmitted by only transmission antenna combination. In order to complement the disadvantage about the small amount of transmission of the SSK, the SM transmission technique was proposed.

The SM transmission technique is configured to increase an amount of transmission by coupling combination between signal modulation constellations and antennas which transmit signals, and has an advantage that there is no interference among reception signals.

However, in the SM technique, the amount of transmission is smaller than that of the MIMO technique of the existing spatial multiplexing. In addition, since an STBC (Space Time Block Coding)-SM transmission technique capable of improving reception performance of SM through orthogonalization of transmission signals is not good in band efficiency, there is a difficult in coping with increasing mass contents and solving a traffic problem of a mobile communication network.

SUMMARY OF THE INVENTION

The invention has been made in consideration of the circumstances described above, and a technical object of the invention is to provide a MIMO communication system using a pre-coder based on a tight frame to secure a transmission capacity larger than those of conventional SM and STBC-SM, by applying a pre-coder matrix based on a tight frame capable of maximizing a diversity gain to transmission signals to disperse it to a transmission matrix in order to increase an amount of transmission of the SM transmission technique having a small amount of transmission.

According to an aspect of the invention to achieve the object described above, there is provided a MIMO communication system using a pre-coder based on a tight frame, which performs a signal transmitting and receiving process through a transmission device including a plurality of transmission antennas and a reception device including a plurality of reception antennas, wherein the transmission device modulates transmission data on the basis of a transmission combination of the transmission antennas and the pre-coder based on the tight frame and transmits the data to the reception device, wherein the reception device generates a channel matrix for each transmission antenna and a detection matrix corresponding to a pre-coder matrix, demodulates a modulation signal received from the transmission device, extracts a transmission antenna combination and the corresponding demodulation signal on the basis of a signal level of a reception signal corresponding to each transmission antenna, and generates a reception signal, wherein the pre-coder G based on the tight frame satisfies $$G = A(A^H A)^{-1/2}$$

and wherein the A is a matrix of n×m size of maximizing a certain coefficient.

Preferably, when the number of transmission antennas is Nt and the number of reception antennas is Nr, the pre-coder G based on the tight frame having a size of NtT×Nr satisfies $$G = \sqrt{T/N_r} A(A^H A)^{-1/2}.$$

Preferably, the pre-coder G satisfies a unitary matrix condition.

Preferably, the number of transmission antennas is at least four, and the number of reception antennas is at least two.

Preferably, the reception antennas are disposed to be orthogonal to each other.

Preferably, the transmission device includes: a plurality of transmission antennas; a data separation unit that separates transmission bit streams into a first bit stream and a second bit stream and outputs them; an antenna combination unit that outputs transmission antenna combination information corresponding to the first bit stream data provided from the data separation unit; a modulation unit that modulates the second bit stream data provided from the data separation unit through the pre-coder based on the tight frame; and a transmission processing unit that transmits the signal modulated by the modulation unit through a transmission antenna corresponding to the transmission antenna combination information provided through the antenna combination unit.

Preferably, the plurality of transmission antennas comprises at least two transmission antenna groups including two transmission antennas, and wherein for the separating of the bit stream by the data separation unit, the first bit stream is set to the number of bits corresponding to the number of combinations which can be transmitted through the transmission antennas of the transmission antenna groups different from each other.

Preferably, the antenna combination unit includes a transmission antenna combination table in which data information is set for each of transmission antenna combination information, and provides the transmission antenna combination information corresponding to the data of the first bit stream provided from the data separation unit on the basis of the transmission antenna combination table.

Preferably, when the number of transmission antennas is four and data are simultaneously transmitted through two transmission antennas different from each other, the modulation unit generates a square matrix such as $$\Gamma = \begin{bmatrix} g_1 g_3 \\ g_2 g_4 \end{bmatrix}$$

to express a vector-type modulation signal g by a code matrix, and provides the square matrix to the transmission processing unit.

Preferably, the transmission processing unit transmits signals through a transmission antenna to correspond to a code matrix corresponding to a transmission antenna combination selected from four types of code matrices $\gamma_1$, $\gamma_2$, $\gamma_3$, and $\gamma_4$ according to transmission antenna combinations such as $$\Gamma = \{\gamma_1, \gamma_2, \gamma_3, \gamma_4\}$$

$$\gamma_1 = \begin{bmatrix} g_1 & g_3 & 0 & 0 \\ g_2 & g_4 & 0 & 0 \end{bmatrix}, \gamma_2 = \begin{bmatrix} 0 & 0 & g_1 & g_3 \\ 0 & 0 & g_2 & g_4 \end{bmatrix}$$

$$\gamma_3 = \begin{bmatrix} 0 & g_1 & g_3 & 0 \\ 0 & g_2 & g_4 & 0 \end{bmatrix}, \gamma_4 = \begin{bmatrix} g_1 & 0 & 0 & g_3 \\ g_2 & 0 & 0 & g_4 \end{bmatrix}$$

and wherein a row of each code matrix represents transmission sequence, and a column represents transmission antenna sequence.

Preferably, the transmission device converts the first bit stream data provided from the data separation unit into a symbol-type signal, and provides the symbol-type signal to the modulation unit.

Preferably, a signal Y' transmitted through each transmission antenna in the transmission device is Y'=X×H, wherein a reception signal Y received by the reception device is Y=X×H+V, and wherein when the X is a transmission matrix and the V is a reception noise, the reception device extracts a transmission antenna of a channel corresponding to a signal level with a smallest difference of Y-Y', and combines data corresponding to the extracted transmission antenna combination information and demodulation data of the channel to generate reception data.

Preferably, the reception device includes: a plurality of reception antennas; a detection matrix generating unit that generates a detection matrix $\bar{h}$ for detecting a channel matrix H and a pre-coder G for a transmission signal according to transmission antenna combinations; and a demodulation unit that extracts transmission antenna combination information of transmitting the signal through the detection matrix $\bar{h}$ provided from the detection matrix generating unit, and demodulates the reception signal, wherein the detection matrix for each channel generated in the detection matrix generating unit is configured in a form of $$\bar{h}_{\mu,1} = \begin{bmatrix} vec\{H_{\gamma_3} G_{s_1}\} \\ vec\{H_{\gamma_3} G_{s_1}\} \\ vec\{H_{\gamma_3} G_{s_1}\} \\ vec\{H_{\gamma_3} G_{s_1}\} \end{bmatrix}^T \bar{h}_{\mu,2} = \begin{bmatrix} vec\{H_{\gamma_3} G_{s_1}\} \\ vec\{H_{\gamma_3} G_{s_1}\} \\ vec\{H_{\gamma_3} G_{s_1}\} \\ vec\{H_{\gamma_3} G_{s_1}\} \end{bmatrix}^T$$

$$\bar{h}_{\mu,3} = \begin{bmatrix} vec\{H_{\gamma_3} G_{s_1}\} \\ vec\{H_{\gamma_3} G_{s_1}\} \\ vec\{H_{\gamma_3} G_{s_1}\} \\ vec\{H_{\gamma_3} G_{s_1}\} \end{bmatrix}^T \bar{h}_{\mu,4} = \begin{bmatrix} vec\{H_{\gamma_3} G_{s_1}\} \\ vec\{H_{\gamma_3} G_{s_1}\} \\ vec\{H_{\gamma_3} G_{s_1}\} \\ vec\{H_{\gamma_3} G_{s_1}\} \end{bmatrix}^T$$

and wherein the demodulation unit compares a difference between the reception signal and the transmission signal for each channel through an equation of $$\begin{bmatrix} s_1 \\ s_2 \\ s_3 \\ s_4 \end{bmatrix} = \arg\min_{s_1 s_2 s_3 s_4 \in Q} \left\| \begin{matrix} y - \bar{h}_{\mu,1} s_1 - \bar{h}_{\mu,2} s_2 \\ -\bar{h}_{\mu,3} s_3 - \bar{h}_{\mu,3} s_4 \end{matrix} \right\|^2$$

$$m_u = \min_{s_1 s_2 s_3 s_4 \in Q} \left\| \begin{matrix} y - \bar{h}_{\mu,1} s_1 - \bar{h}_{\mu,2} s_2 \\ -\bar{h}_{\mu,3} s_3 - \bar{h}_{\mu,3} s_4 \end{matrix} \right\|^2$$

$$\bar{\mu} = \arg\min_u m_u$$

to generate reception data on the basis of the demodulation signal and the transmission antenna combination information corresponding to the channel with a small difference.

Preferably, the reception device further includes a demapping unit that converts the symbol-type signal provided from the demodulation unit into bit-type data, and outputs the bit-type data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
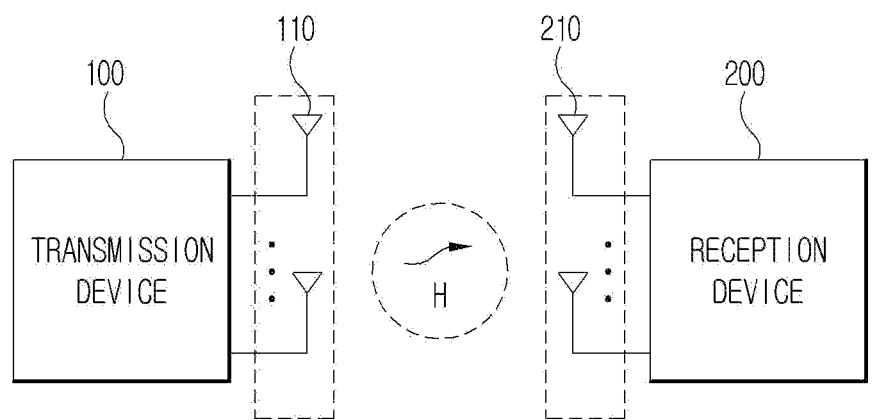
FIG. 1 is a diagram illustrating a schematic configuration of a MIMO communication system using a pre-coder based on a tight frame according to a first embodiment of the invention.

Hereinafter, a preferred embodiment of the invention will be described in detail with reference to the accompanying drawings.

First, a method of generating a pre-coder based on a tight frame applied to the invention will be described.

A total sum of transmission antenna power of a MIMO system has to be the same as that of a single antenna system, and a power limitation equation according thereto is acquired as Math 1.

$$tr \sum_{n=0}^{N-1} M_n M_n^H = T \quad \text{[Math 1]}$$

$$tr M_n M_n^H = \frac{T}{N} \quad n = 0, 1, \ldots, N-1$$

Herein, $M_n$ denotes the number of pre-coders to generate, N denotes the number of symbols different from each other included in one transmission matrix, and $(.)^H$ denotes a Hermitian matrix. In addition, T denotes a time when one symbol is transmitted, and tr (trace) means a sum of all diagonal components. In this case, a diagonal sum of a square of the pre-coder $M_n$ to be generated in Math 1 is the same as the time when the symbol is transmitted. In other words, power of the pre-coder multiplied by the transmission matrix of the signals has to be 1 and, in order to satisfy such a condition, the pre-coder has to be a unitary matrix. Reception algorithm of the signals to which such a pre-coder is applied is acquired as Math 2.

$$Y = \sqrt{E_s} H \sum_{n=0}^{N-1} M_n s_n + V \quad \text{[Math 2]}$$

Herein, $S_n$ denotes a symbol vector, and Math 2 is acquired as Math 3 when $M_n$ is represented using a Kronecker product $\otimes$ to easily detect a reception signal.

$$Y = \sqrt{E_s} I_T \otimes HGs + V \quad \text{[Math 3]}$$

Herein, $G=[\text{vec}(M_0), \text{vec}(M_1), \ldots, \text{vec}(M_{N-1})]$. is that the pre-coder $M_n$ is vectorized, and $\text{vec}(M_0), \text{vec}(M_1), \ldots, \text{vec}(M_{N-1})$ corresponding to a column of $M_n$ is represented by a matrix. In this case, in Math 3, a covariance matrix between the reception signal vector $y_n$ and the transmission signal $s_n$ is acquired as Math 4.

$$R_s = \left\{ \sum_{n=0}^{N-1} M_n(s_n - y_n) \right\} \times \left\{ \sum_{n=0}^{N-1} M_n(s_n - y_n) \right\}^T \quad \text{[Math 4]}$$

$$= \sum_{n_1=0}^{N-1} \sum_{n_2=0}^{N-1} M_{n_1}^* M_{n_2} e_{n_1}^* e_{n_2}$$

In Math 4, the covariance matrix $R_s$ may be expressed by an equation about each pre-coder matrix and error, and a pairwise error probability is acquired as Math 5 to reduce a reception error probability.

$$P(S^{(m)} \to S^{(k)}) \leq \frac{1}{\left(\frac{E_s}{4N_0}\right)^{rank(R_s)N_r} \prod_{n=1}^{rank(R_s)} \lambda_n^{N_r}} \quad \text{[Math 5]}$$

Meanwhile, in Math 5, when an upper band of the pariwise error is reduced, the pairwise error probability is also reduced inevitably.

Accordingly, it is important to maximize a rank of the covariance matrix which can be controlled at a dominator part of Math 5. In order to maximize the rank of such a covariance matrix, a covariance matrix is acquired again as Math 6 using G that is a vectorization form of the pre-coder $M_n$.

$$R_s = \begin{bmatrix} e^H G_0^H G_0 e & \cdots & e^H G_0^H G_{T-1} e \\ \vdots & \ddots & \vdots \\ e^H G_{T-1}^H G_0 e & \cdots & e^H G_{T-1}^H G_{T-1} e \end{bmatrix} \quad \text{[Math 6]}$$

In order to maximize the covariance matrix reorganized in Math 6 and to embody a pre-coder vector G satisfying Math 1, the G when a matrix A with a size of n×m maximizing a certain rank is given is defined as a tight frame, and is acquired as Math 7.

$$G = A(A^H A)^{-1/2} \quad \text{[Math 7]}$$

In addition, examining whether the G satisfying Math 7 is suitable for power limitation, it is acquired as Math 8.

$$G^H G = (A^H A)^{-H/2} A^H A (A^H A)^{-1/2} \quad \text{[Math 8]}$$

$$= (A^H A)^{-H/2} (A^H A)^{H/2} (A^H A)^{1/2} (A^H A)^{-1/2}$$

$$= I$$

In Math 8, since $G^H G$ is accurately represented by a unit matrix, it can be known that it satisfies the power limitation of Math 1.

In this case, when the number of transmission antennas is $N_t$ and the number of reception antennas is $N_r$, the G having $N_t T \times N_r$ is acquired as Math 9.

$$G = \sqrt{T/N_t} A(A^H A)^{-1/2} \quad \text{[Math 9]}$$

Meanwhile, FIG. 1 is a diagram illustrating a configuration of a MIMO communication system using a pre-coder based on a tight frame according to a first embodiment of the invention.

As illustrated in FIG. 1, the MIMO communication system using a pre-coder based on a tight frame according to the invention includes a transmission device 100 that includes a plurality of transmission antennas 110 and performs a signal transmission process, and a reception device 200 that includes a plurality of reception antennas 210 and receives a signal provided from the transmission device 100.

In this case, the transmission device 100 performs a modulation process on the basis of a combination of transmission antennas and a pre-coder based on a tight frame, and transmits a modulation signal to the reception device 200. In this case, the signals output through the transmission antenna 110 of the transmission device 100 are received through various paths, that is, channels H by the reception device 200.

The reception device 200 performs a demodulation process on the signal for each channel H with respect to the signal received from the transmission device 100, calculates a signal level of the reception signal corresponding to each channel, combines transmission antenna combination information and the demodulation signal for the reception signal of the channel on the basis of channel information with a small difference from a preset reference signal level for each channel, and generates a reception signal.

Figure 2:
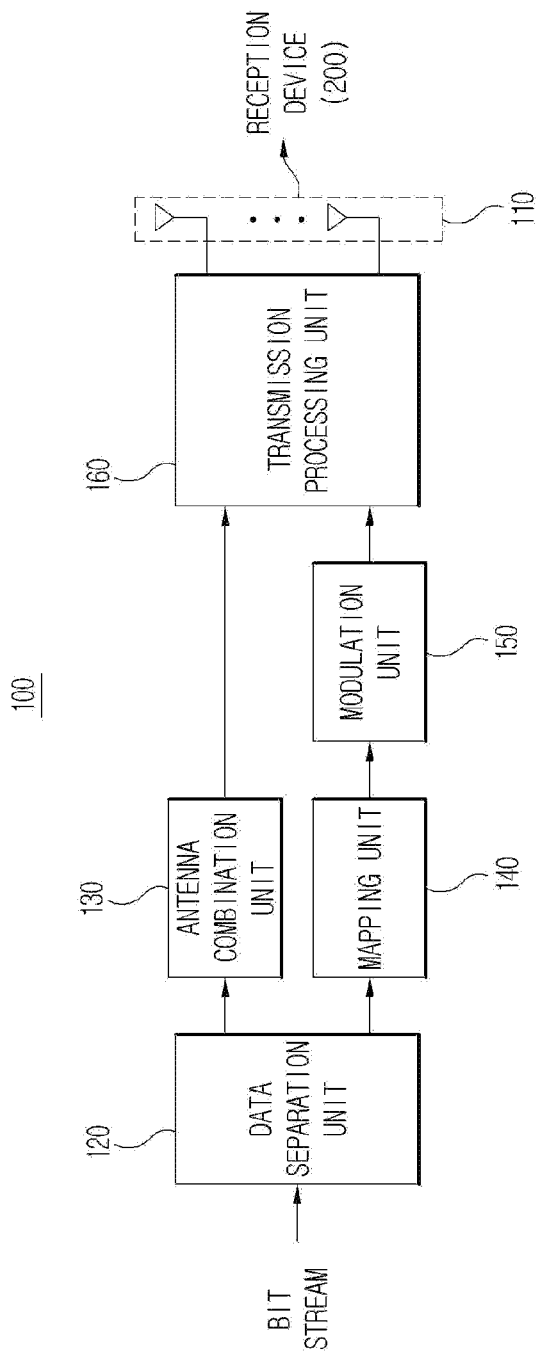
FIG. 2 is a functional block diagram illustrating an internal configuration of a transmission device illustrated in FIG. 1.

Meanwhile, as illustrated in FIG. 2, the transmission device 100 includes transmission antennas 110, a data separation unit 120, an antenna combination unit 130, a mapping unit 140, a modulation unit 150, and a transmission processing unit 160.

The number of transmission antennas 110 is at least four. In this case, two transmission antennas 110 simultaneously performing transmission processes are set to one transmission antenna group, and at least two transmission antenna groups are set. In this case, the combination of the transmission antennas for signal transmission set to the transmission antennas of the transmission antenna groups different from each other.

The data separation unit 120 separates transmission bit streams into a first bit stream and a second bit stream, and output the bit streams. In this case, the first bit stream is provided to the antenna combination unit 130, and the second bit stream is provided to the mapping unit 140. In addition, the first bit stream is set to the number of bits corresponding to the number of combinations of the transmission antennas simultaneously performing the signal transmission, and the second bit stream is set to the number of bits of the bit streams other than the first bit stream. For example, when the number of transmission antennas 110 is four and the number of transmission antennas which can simultaneously perform transmission is two, the number of combinations of transmission through the transmission antennas of the transmission antenna groups different from each other in four transmission antennas is four (when odd-numbered transmission antennas are included in the first transmission antenna group, and the even-numbered transmission antennas are included in the second transmission antenna group, four combinations of (1,2), (3,4), (2,3), and (1,4) are generated) and two bits which can express four kinds of information are set to the number of bits of the first bit stream.

The antenna combination unit 130 includes a transmission antenna combination table in which data information for each of combination information of the transmission antennas is set, and provides transmission antenna combination information corresponding to the first bit stream provided from the data separation unit 120, to the transmission processing unit 160 on the basis of the transmission antenna combination table. For example, when the first bit stream data is "00", the transmission antenna combination information corresponding thereto, that is, the transmission antenna combination information (1,2) corresponding to the first and second transmission antennas is provided to the transmission processing unit 160. When the first bit stream data is "10", the transmission antenna combination information (3,4) corresponding to the third and fourth transmission antennas corresponding thereto is provided to the transmission processing unit 160.

Figure 3:
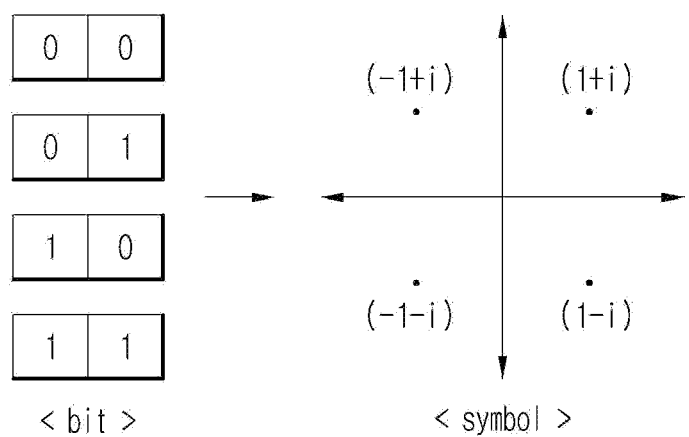
FIG. 3 is a diagram illustrating an example of a signal conversion state of a mapping unit illustrated in FIG. 1.

The mapping unit 140 converts the input bit-type data of the second bit stream into symbol-type data. In this case, as illustrated in FIG. 3, the process of converting the bit information into the symbol type is the general technique, and detailed description thereof is omitted. For example, when 2-bit (signals are simultaneously transmitted through two transmission antennas) data to be transmitted in the second bit stream is "00", it is converted into "1+i"-type symbol information, and is provided to the transmission processing unit 160.

The modulation unit 150 modulates the symbol provided from the mapping unit 140 through the pre-coder based on the tight frame, and provides it to the transmission processing unit 160. That is, the modulation unit 150 applies a tight-frame pre-code to be described later to signals to be transmitted. Math 10 represents a modulation signal form generated by multiplying a tight-frame pre-coder matrix G by a signal s vector.

$$Gs = \begin{bmatrix} g_1 \\ g_g \\ g_3 \\ g_4 \end{bmatrix} \qquad \text{[Math 10]}$$

In this case, the modulation unit 150 generates a square matrix in a form of such as Math 11 to express a vector-type modulation signal such as Math 10 by a code matrix, and provides it to the transmission processing unit 160.

$$\Gamma = \begin{bmatrix} g_1 & g_3 \\ g_2 & g_4 \end{bmatrix} \qquad \text{[Math 11]}$$

The transmission processing unit 160 provides the modulation signal provided from the modulation unit 150, to the transmission antennas corresponding to the transmission antenna combination information provided from the antenna combination unit 130, and transmits the modulation signal to the reception device 200 through the selected transmission antennas. In this case, the signals transmitted through the transmission antennas 110 selected in the transmission processing unit 160 are as Math 12.

$$\hat{\Gamma} = \{\gamma_1, \gamma_2, \gamma_3, \gamma_4\} \qquad \text{[Math 12]}$$
$$\gamma_1 = \begin{bmatrix} g_1 & g_3 & 0 & 0 \\ g_2 & g_4 & 0 & 0 \end{bmatrix}, \gamma_2 = \begin{bmatrix} 0 & 0 & g_1 & g_3 \\ 0 & 0 & g_2 & g_4 \end{bmatrix}$$
$$\gamma_3 = \begin{bmatrix} 0 & g_1 & g_3 & 0 \\ 0 & g_2 & g_4 & 0 \end{bmatrix}, \gamma_4 = \begin{bmatrix} g_1 & 0 & 0 & g_3 \\ g_2 & 0 & 0 & g_4 \end{bmatrix}$$

In other words, as illustrated in Math 12, the transmission processing unit 160 transmits signals of a matrix corresponding to the transmission antenna combination selected from the four types of code matrices $\gamma_1$, $\gamma_2$, $\gamma_3$, and $\gamma_4$, through the transmission antennas. In this case, the row of the code matrix represents transmission sequence, and the column represents transmission antenna sequence. For example, the code matrix $\gamma_1$ is a case where the transmission antenna combination information is (1,2), and signals are transmitted through the first and second transmission antennas. In this case, first, the signal "$g_1$" and the signal "$g_3$" are simultaneously transmitted through the first transmission antenna and the second transmission antenna, respectively, and then the signal "$g_2$" and the signal "$g_2$" are simultaneously transmitted through the first transmission antenna and the second transmission antenna, respectively. In addition, in the code matrix $\gamma_1$, the values of the third and fourth transmission antennas are "0", they are not transmitted.

In other words, the transmission device 100 performs the antenna combination and modulation process on the transmission data, and transmits the signal to the reception device 200. In this case, the signals transmitted to the reception device 200 through the transmission antennas 110 are provided to the reception device 200 through various channels H, and the reception signals passing through the channels H are as Math 13.

$$Y = X \times H + V \qquad \text{[Math 13]}$$

Herein, the Y denotes a reception matrix, the X denotes the transmission matrix, and the V denotes a thermal noise of a receiver taken along Gaussian distribution. In this case, the transmission matrix "X" may be represented by G·s (product of pre-coder and signal) of Math 13. The reception device 200 receives the signals in a form in which the product of the transmission matrix X obtained by modulating the transmission signal s through the pre-coder G and the channel matrix H, to which the noise component V is added. Accordingly, the reception device 200 extracts a transmission antenna of a channel corresponding to a signal level with the smallest difference between the actually transmitted signal and the reception signal, and combines data corresponding to the extracted transmission antenna combination information and demodulation data of the channel to generate reception data.

Figure 4:
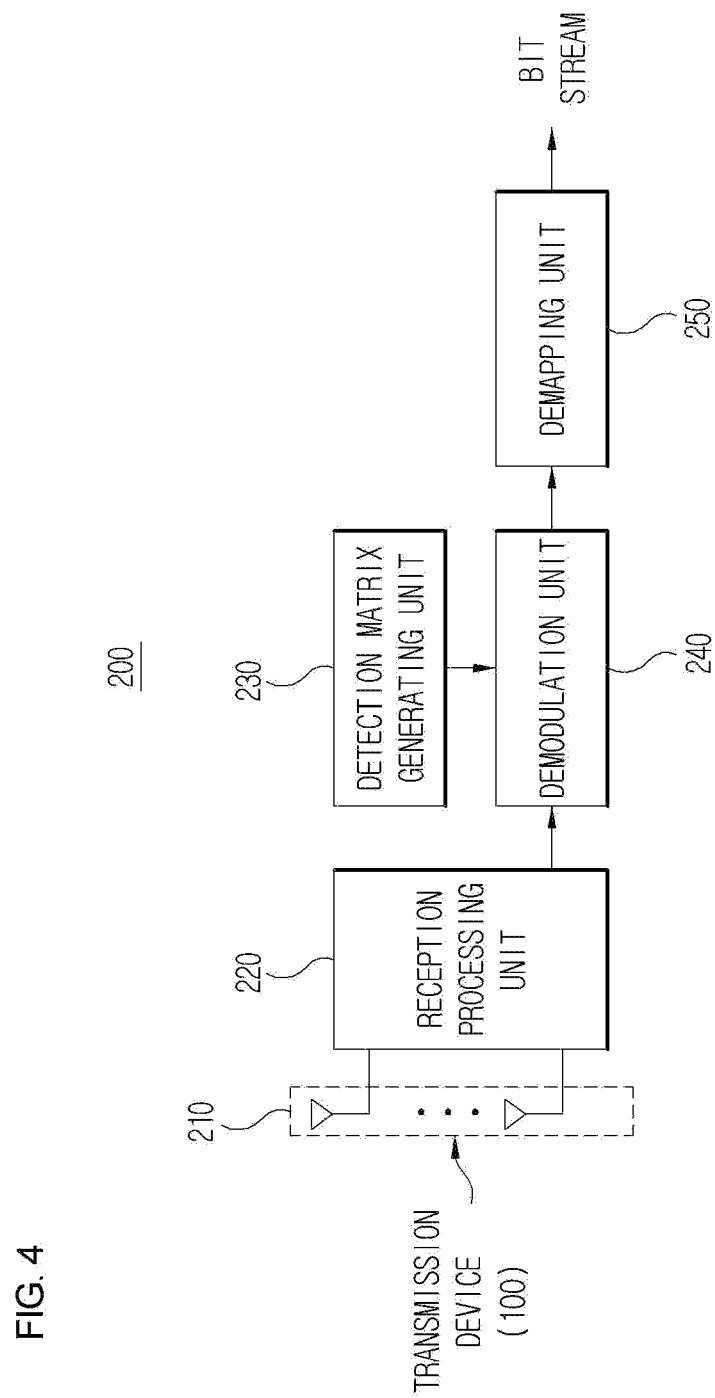
FIG. 4 is a functional block diagram illustrating an internal configuration of a reception device illustrated in FIG. 1.

Meanwhile, as illustrated in FIG. 4, the reception device 200 includes reception antennas 210, a reception processing unit 220, a detection matrix generating unit 230, a demodulation unit 240, and a demapping unit 250.

The number of reception antennas 210 is at least two. In this case, the reception antennas 210 may be disposed in an orthogonal form to maximize diversity efficiency. This is to minimize interference among reception signals.

The reception processing unit 220 provides the reception signal provided from each reception antenna 210, to the demodulation unit 240. In this case, the reception processing unit 220 receives at least two signals to correspond to the simultaneously transmitted transmission signals according to preset communication protocol, and provides the signals to the demodulation unit 240. For example, when two signals are simultaneously transmitted through two transmission antennas 110, two signals of the reception processing unit 220 are received and provided to the demodulation unit 240.

The detection matrix generating unit 230 generates a detection matrix $\bar{h}$ using the preset channel matrix H and the pre-coder G matrix. In this case, the channel matrix H and the pre-coder G matrix corresponding to the transmission signals set in Math 12 are acquired as Math 14 and Math 15, respectively, and the detection matrix $\bar{h}$ corresponding to the transmission signals finally generated through them is acquired as Math 16.

$$H_{\gamma_1} = \begin{bmatrix} H_{1,1}H_{2,1} \\ H_{1,2}H_{2,2} \\ H_{1,3}H_{2,3} \\ H_{1,4}H_{2,4} \end{bmatrix}, H_{\gamma_2} = \begin{bmatrix} H_{3,1}H_{4,1} \\ H_{3,2}H_{4,2} \\ H_{3,3}H_{4,3} \\ H_{3,4}H_{4,4} \end{bmatrix} \quad [\text{Math 14}]$$

$$H_{\gamma_3} = \begin{bmatrix} H_{2,1}H_{3,1} \\ H_{2,2}H_{3,2} \\ H_{2,3}H_{3,3} \\ H_{2,4}H_{3,4} \end{bmatrix}, H_{\gamma_4} = \begin{bmatrix} H_{1,1}H_{4,1} \\ H_{1,2}H_{4,2} \\ H_{1,3}H_{4,3} \\ H_{1,4}H_{4,4} \end{bmatrix}$$

Herein, the channel matrix H is a matrix about the transmission signals for each transmission antenna.

$$G_{g_1} = \begin{bmatrix} G_{1,1} & G_{2,1} \\ G_{3,1} & G_{4,1} \end{bmatrix} G_{g_2} = \begin{bmatrix} G_{1,2} & G_{2,2} \\ G_{3,2} & G_{4,2} \end{bmatrix} \quad [\text{Math 15}]$$

$$G_{g_3} = \begin{bmatrix} G_{1,2} & G_{2,3} \\ G_{3,3} & G_{4,3} \end{bmatrix} G_{g_4} = \begin{bmatrix} G_{1,4} & G_{2,4} \\ G_{3,4} & G_{4,4} \end{bmatrix}$$

Herein, the pre-coder matrix G is a matrix for the modulated transmission signals for each transmission antenna combination.

$$\bar{h}_{\mu,1} = \begin{bmatrix} \text{vec}\{H_{\gamma_1}G_{g_1}\} \\ \text{vec}\{H_{\gamma_2}G_{g_1}\} \\ \text{vec}\{H_{\gamma_3}G_{g_1}\} \\ \text{vec}\{H_{\gamma_4}G_{g_1}\} \end{bmatrix}^T \bar{h}_{\mu,2} = \begin{bmatrix} \text{vec}\{H_{\gamma_1}G_{g_2}\} \\ \text{vec}\{H_{\gamma_2}G_{g_2}\} \\ \text{vec}\{H_{\gamma_3}G_{g_2}\} \\ \text{vec}\{H_{\gamma_4}G_{g_2}\} \end{bmatrix}^T \quad [\text{Math 16}]$$

$$\bar{h}_{\mu,3} = \begin{bmatrix} \text{vec}\{H_{\gamma_1}G_{g_3}\} \\ \text{vec}\{H_{\gamma_2}G_{g_3}\} \\ \text{vec}\{H_{\gamma_3}G_{g_3}\} \\ \text{vec}\{H_{\gamma_4}G_{g_3}\} \end{bmatrix}^T \bar{h}_{\mu,4} = \begin{bmatrix} \text{vec}\{H_{\gamma_1}G_{g_4}\} \\ \text{vec}\{H_{\gamma_2}G_{g_4}\} \\ \text{vec}\{H_{\gamma_3}G_{g_4}\} \\ \text{vec}\{H_{\gamma_4}G_{g_4}\} \end{bmatrix}^T$$

Herein, the detection matrix generating unit 230 generates a channel matrix H for the transmission signals for each transmission antenna combination a channel matrix H for detecting the pre-coder G, and a detection matrix $\bar{h}$ such as Math 16 for a reverse process for the pre-coder G matrix. In other words, the detection matrix $\bar{h}$ may be represented as a Hermitian matrix for a vector component of a product of the channel matrix H for the transmission signals for each transmission antenna combination and the pre-coder G matrix.

The demodulation unit 240 discriminates the transmission antennas which transmit the signals through detection based on the reception signals provided from the reception signal processing unit 220 and the detection matrix $\bar{h}$ provided from the detection matrix generating unit 230, and performs a demodulation process on the reception signals. Math 17 represents equations of the transmission antenna discrimination and the demodulation process on the pre-coding modulation signals. Herein, $\mu$ denotes an order of the channel matrix H, and Q denotes a modulation constellation.

$$\begin{bmatrix} \bar{s}_1 \\ \bar{s}_2 \\ \bar{s}_3 \\ \bar{s}_4 \end{bmatrix} = \arg \min_{s_1,s_2,s_3,s_4 \in Q} \left\| \begin{matrix} y - \bar{h}_{\mu,1}s_1 - \bar{h}_{\mu,2}s_2 \\ -\bar{h}_{\mu,3}s_3 - \bar{h}_{\mu,3}s_4 \end{matrix} \right\|^2 \quad [\text{Math 17}]$$

$$m_\mu = \min_{s_1,s_2,s_3,s_4 \in Q} \left\| \begin{matrix} y - \bar{h}_{\mu,1}s_1 - \bar{h}_{\mu,2}s_2 \\ -\bar{h}_{\mu,3}s_3 - \bar{h}_{\mu,3}s_4 \end{matrix} \right\|^2$$

$$\bar{\mu} = \arg\min_\mu m_\mu$$

In other words, the demodulation unit 240 calculates a difference between the reception signals y received from the reception antennas 210 for each channel and the transmission signals h·s through Math 17, and generates reception data on the basis of transmission antenna combination information corresponding to a channel with the smallest difference and the demodulation signals.

The demapping unit 250 combines the first data corresponding to the transmission antenna combination detected through the demodulation unit 240, and the reception signals in the symbol form of, for example, "1+i" corresponding to the demodulation signal according to a preset regulation on the basis of the second data in a form of "00", to generate one reception bit stream. In other words, the demapping unit 250 performs a reverse conversion process illustrated in FIG. 4.

In other words, according to the embodiment, the demodulation process and the transmission antenna detection for the received signals can be accurately performed through Math 17, and reception performance is improved due to an influence of performance having a low error probability of the pre-coder based on the tight frame.

Figure 5:
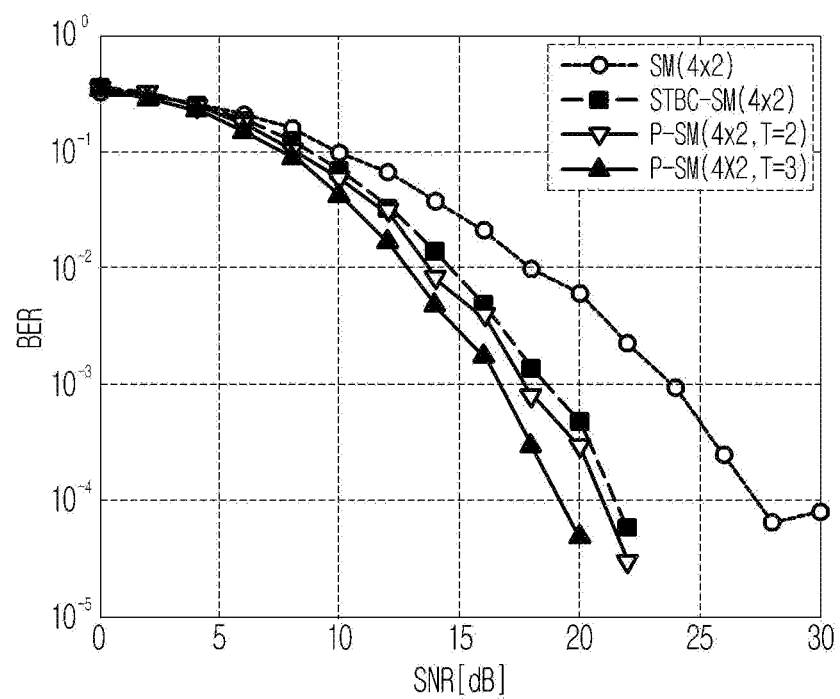
FIG. 5 and FIG. 6 are diagrams illustrating comparative experiment results of reception performance according to the number of transmission/reception antennas in an experiment environment such as Table 1.
Figure 6:
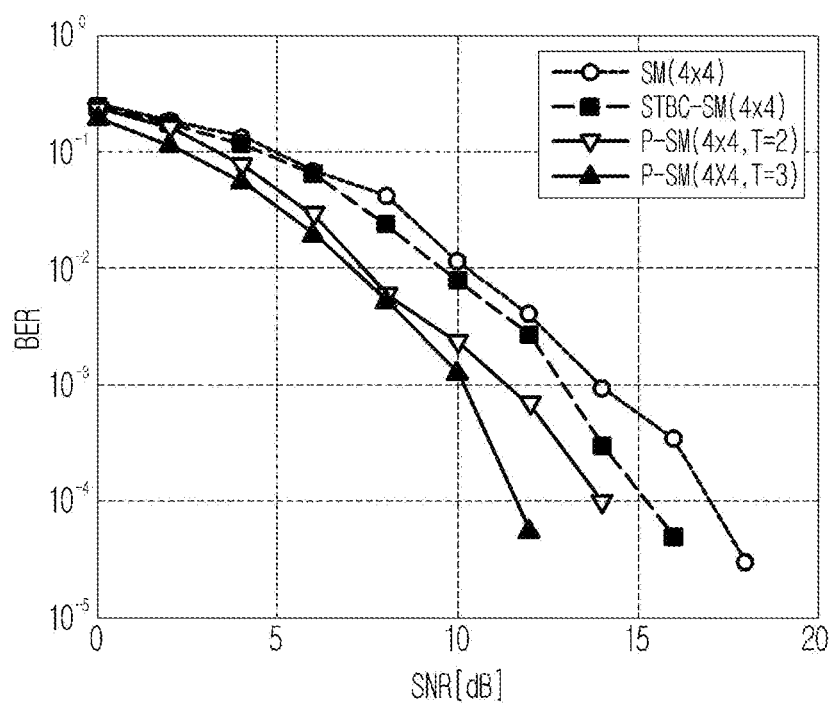

Meanwhile, FIG. 5 and FIG. 6 are diagrams illustrating examples of experiment results obtained by measuring band efficiency according to SM and STBC-SM and the number of transmission and reception antennas in the communication system according to the invention by the inventor. In this case, an experiment environment in which the experiment result is provided is illustrated in Table 1.

TABLE 1

|  | SM | STEC-SM | P-SM (T = 2) | P-SM (T = 3) |
|---|---|---|---|---|
| MIMO Configuration | 4 × 2, 4 × 4 | 4 × 2, 4 × 4 | 4 × 2, 4 × 4 | 4 × 2, 4 × 4 |
| Band Efficiency | 5 bit/s (8 QAM) | 5 bit/s (16 QAM) | 5 bit/s (QPSK) | (14/3) bit/s (QPSK) |
| Channel Environment | Rayleigh | Rayleigh | Rayleigh | Rayleigh |

As illustrated in Table 1, a Rayleigh channel was applied as a channel, 8-QAM was used as SM and 16-QAM was used as STBC-SM in order to set band efficiency to be equal, QPSK was used as P-SM according to the invention to set the band efficiency to 5 bits at T=2, and QPSK was used to set the band efficiency 14/3 bit at T=3.

FIG. 5 illustrates comparison of reception performance when the number of transmission and reception antennas is 4×2 in the experiment environment such as Table 1. In other words, as illustrated in FIG. 5, it can be seen that the reception performance of the P-SM transmission technique (T=2) according to the invention is raised by about 10 dB as compared with SM and by about 0.5 dB as compared with STBC-SM, on the basis of BER (bit error rate) of $10^{-4}$. The reason is because, when the tight-frame pre-coder is used, a diversity gain is highest at N=4 by dispersing and transmitting all of four symbols different from each other in one channel matrix.

In addition, FIG. 6 illustrates reception performance when the number of transmission and reception antennas is 4×4, in the experiment environment illustrated in Table 1. In other words, as illustrated in FIG. 6, it can be seen that the reception performance of the P-SM transmission technique (T=3) according to the invention is raised by about 5 dB as compared with SM and by about 3.5 dB as compared with STBC-SM, on the basis of BER (bit error rate) of $10^{-4}$. As the number of reception antennas is increased, the obtainable diversity gain is also increased, and the high reception performance can be obtained since the tight-frame pre-coder capable of reducing an error probability is applied.

Therefore, according to the embodiment, by modulating and transmitting the signals through the combination of transmission antennas and the tight-frame pre-coder with a low error probability, it is possible to improve reception performance and transmission efficiency as compared with the conventional MIMO communication system.

According to the invention, signals are modulated and transmitted through combination of transmission antennas and a pre-coder based on a tight frame with a low error probability, and it is possible to thereby improve reception performance and transmission efficiency as compared with the conventional MIMO communication system.

Although the invention has been described according to the preferred embodiment mentioned above, the invention can be variously changed and modified without deviating from the essential point and scope of the invention. Accordingly, the accompanying Claims include such change and modification belonging to the essential point of the invention.

What is claimed is:

1. A MIMO (multi-input multi-output) communication system using a pre-coder based on a tight frame, which performs a signal transmitting and receiving process through a transmission device including a plurality of transmission antennas and a reception device including a plurality of reception antennas,
   wherein the transmission device modulates transmission data on a basis of a transmission combination of the transmission antennas and the pre-coder based on the tight frame and transmits the data to the reception device,
   wherein the reception device generates a channel matrix for each transmission antenna and a detection matrix corresponding to a pre-coder matrix, demodulates a modulation signal received from the transmission device, extracts a transmission antenna combination and on a corresponding demodulation signal on a basis of a signal level of a reception signal corresponding to each transmission antenna, and generates a reception signal,
   wherein the pre-coder G based on the tight frame satisfies $G=A(A^H A)^{-1/2}$, and
   wherein the A is a matrix of n (number of rows) × m (number of columns) size of maximizing a certain coefficient.

2. The MIMO communication system using the pre-coder based on the tight frame according to claim 1, wherein when on a number of transmission antennas is Nt and on a number of reception antennas is Nr, the pre-coder G based on the tight frame having a size of NtT×Nr satisfies $G=\sqrt{T/N_r}A(A^H A)^{-1/2}$.

3. The MIMO communication system using the pre-coder based on the tight frame according to claim 1, wherein the pre-coder G satisfies a unitary matrix condition.

4. The MIMO communication system using the pre-coder based on the tight frame according to claim 1, wherein on a number of transmission antennas is at least four, and on a number of reception antennas is at least two.

5. The MIMO communication system using the pre-coder based on the tight frame according to claim 4, wherein the reception antennas are disposed to be orthogonal to each other.

6. The MIMO communication system using the pre-coder based on the tight frame according to claim 1, wherein the transmission device further comprises:
   plurality of transmission antennas;
   a data separation unit that separates transmission bit streams into a first bit stream and a second bit stream and outputs them;
   an antenna combination unit that outputs transmission antenna combination information corresponding to the first bit stream data provided from the data separation unit;
   a modulation unit that modulates the second bit stream data provided from the data separation unit through the pre-coder based on the tight frame; and
   a transmission processing unit that transmits the signal modulated by the modulation unit through a transmission antenna corresponding to the transmission antenna combination information provided through the antenna combination unit.

7. The MIMO communication system using the pre-coder based on the tight frame according to claim 6, wherein the plurality of transmission antennas comprises at least two transmission antenna groups including two transmission antennas, and
    wherein for the separating of the bit stream by the data separation unit, the first bit stream is set to on a number of bits corresponding to on a number of combinations which can be transmitted through the transmission antennas of the transmission antenna groups different from each other.

8. The MIMO communication system using the pre-coder based on the tight frame according to claim 6, wherein the antenna combination unit includes a transmission antenna combination table in which data information is set for each of transmission antenna combination information, and provides the transmission antenna combination information corresponding to the data of the first bit stream provided from the data separation unit on the basis of the transmission antenna combination table.

9. The MIMO communication system using the pre-coder based on the tight frame according to claim 6, wherein when on a number of transmission antennas is four and data are simultaneously transmitted through two transmission antennas different from each other, the modulation unit generates a square matrix such as $$\Gamma = \begin{bmatrix} g_1 & g_3 \\ g_2 & g_4 \end{bmatrix}$$

to express a vector-type modulation signal g by a code matrix, and provides the square matrix to the transmission processing unit.

10. The MIMO communication system using the pre-coder based on the tight frame according to claim 9, wherein the transmission processing unit transmits signals through a transmission antenna to correspond to a code matrix corresponding to a transmission antenna combination selected from four types of code matrices $\gamma_1, \gamma_2, \gamma_3,$ and $\gamma_4$ according to transmission antenna combinations such as $$\tilde{\Gamma} = \{\gamma_1, \gamma_2, \gamma_3 \gamma_4\}$$

$$\gamma_1 = \begin{bmatrix} g_1 & g_3 & 0 & 0 \\ g_2 & g_4 & 0 & 0 \end{bmatrix}, \gamma_2 = \begin{bmatrix} 0 & 0 & g_1 & g_3 \\ 0 & 0 & g_2 & g_4 \end{bmatrix}$$

$$\gamma_3 = \begin{bmatrix} 0 & g_1 & g_3 & 0 \\ 0 & g_2 & g_4 & 0 \end{bmatrix}, \gamma_4 = \begin{bmatrix} g_1 & 0 & 0 & g_3 \\ g_2 & 0 & 0 & g_4 \end{bmatrix},$$

and
wherein a row of each code matrix represents transmission sequence, and a column represents transmission antenna sequence.

11. The MIMO communication system using the pre-coder based on the tight frame according to claim 6, wherein the transmission device converts the first bit stream data provided from the data separation unit into a symbol-type signal, and provides the symbol-type signal to the modulation unit.

12. The MIMO communication system using the pre-coder based on the tight frame according to claim 1, wherein a signal Y' transmitted through each transmission antenna in the transmission device is Y'=X×H,
    wherein a reception signal Y received by the reception device is Y=X×H+V, and
    wherein when the X is a transmission matrix, the H is a channel matrix and the V is a reception noise, the reception device extracts a transmission antenna of a channel corresponding to a signal level with a smallest difference of Y-Y', and combines data corresponding to the extracted transmission antenna combination information and demodulation data of the channel to generate reception data.

13. The MIMO communication system using the pre-coder based on the tight frame according to claim 1, wherein the reception device further comprises:
    plurality of reception antennas;
    a detection matrix generating unit that generates a detection matrix $\bar{h}$ for detecting a channel matrix H and a pre-coder G for a transmission signal according to transmission antenna combinations; and
    a demodulation unit that extracts transmission antenna combination information of transmitting the signal through the detection matrix $\bar{h}$ provided from the detection matrix generating unit, and demodulates the reception signal,
    wherein the detection matrix for each channel generated in the detection matrix generating unit is configured in a form of $$\bar{h}_{\mu,1} = \begin{bmatrix} \text{vec}\{H_{\gamma_1}G_{g_1}\} \\ \text{vec}\{H_{\gamma_2}G_{g_1}\} \\ \text{vec}\{H_{\gamma_3}G_{g_1}\} \\ \text{vec}\{H_{\gamma_4}G_{g_1}\} \end{bmatrix}^T \bar{h}_{\mu,2} = \begin{bmatrix} \text{vec}\{H_{\gamma_1}G_{g_2}\} \\ \text{vec}\{H_{\gamma_2}G_{g_2}\} \\ \text{vec}\{H_{\gamma_3}G_{g_2}\} \\ \text{vec}\{H_{\gamma_4}G_{g_2}\} \end{bmatrix}^T$$

$$\bar{h}_{\mu,3} = \begin{bmatrix} \text{vec}\{H_{\gamma_1}G_{g_3}\} \\ \text{vec}\{H_{\gamma_2}G_{g_3}\} \\ \text{vec}\{H_{\gamma_3}G_{g_3}\} \\ \text{vec}\{H_{\gamma_4}G_{g_3}\} \end{bmatrix}^T \bar{h}_{\mu,4} = \begin{bmatrix} \text{vec}\{H_{\gamma_1}G_{g_4}\} \\ \text{vec}\{H_{\gamma_2}G_{g_4}\} \\ \text{vec}\{H_{\gamma_3}G_{g_4}\} \\ \text{vec}\{H_{\gamma_4}G_{g_4}\} \end{bmatrix}^T,$$

and
wherein the demodulation unit compares a difference between the reception signal and the transmission signal for each channel through an equation of $$\begin{bmatrix} \tilde{s}_1 \\ \tilde{s}_2 \\ \tilde{s}_3 \\ \tilde{s}_4 \end{bmatrix} = \arg\min_{s_1,s_2,s_3,s_4 \in Q} \left\| \begin{array}{c} y - \bar{h}_{\mu,1}s_1 - \bar{h}_{\mu,2}s_2 \\ -\bar{h}_{\mu,3}s_3 - \bar{h}_{\mu,3}s_4 \end{array} \right\|^2$$

$$m_\mu = \min_{s_1,s_2,s_3,s_4 \in Q} \left\| \begin{array}{c} y - \bar{h}_{\mu,1}s_1 - \bar{h}_{\mu,2}s_2 \\ -\bar{h}_{\mu,3}s_3 - \bar{h}_{\mu,3}s_4 \end{array} \right\|^2$$

$$\bar{\mu} = \arg\min_\mu m_\mu$$

to generate reception data on the basis of the demodulation signal and the transmission antenna combination information corresponding to the channel with a small difference, wherein $\mu$ denotes an order of the channel matrix $\bar{h}$, Q denotes a modulation constellation, and $\tilde{S}$ denotes the demodulation signal.

14. The MIMO communication system using the pre-coder based on the tight frame according to claim 12, wherein the reception device further comprises:
    plurality of reception antennas;
    a detection matrix generating unit that generates a detection matrix $\bar{h}$ for detecting a channel matrix H and a pre-coder G for a transmission signal according to transmission antenna combinations; and a demodulation unit that extracts transmission antenna combination information of transmitting the signal through the detection matrix $\bar{h}$ provided from the detection matrix generating unit, and demodulates the reception signal, wherein the detection matrix for each channel generated in the detection matrix generating unit is configured in a form of $$\bar{h}_{\mu,1} = \begin{bmatrix} \text{vec}\{H_{\gamma_1}G_{g_1}\} \\ \text{vec}\{H_{\gamma_2}G_{g_1}\} \\ \text{vec}\{H_{\gamma_3}G_{g_1}\} \\ \text{vec}\{H_{\gamma_4}G_{g_1}\} \end{bmatrix}^T \bar{h}_{\mu,2} = \begin{bmatrix} \text{vec}\{H_{\gamma_1}G_{g_2}\} \\ \text{vec}\{H_{\gamma_2}G_{g_2}\} \\ \text{vec}\{H_{\gamma_3}G_{g_2}\} \\ \text{vec}\{H_{\gamma_4}G_{g_2}\} \end{bmatrix}^T$$

$$\bar{h}_{\mu,3} = \begin{bmatrix} \text{vec}\{H_{\gamma_1}G_{g_3}\} \\ \text{vec}\{H_{\gamma_2}G_{g_3}\} \\ \text{vec}\{H_{\gamma_3}G_{g_3}\} \\ \text{vec}\{H_{\gamma_4}G_{g_3}\} \end{bmatrix}^T \bar{h}_{\mu,4} = \begin{bmatrix} \text{vec}\{H_{\gamma_1}G_{g_4}\} \\ \text{vec}\{H_{\gamma_2}G_{g_4}\} \\ \text{vec}\{H_{\gamma_3}G_{g_4}\} \\ \text{vec}\{H_{\gamma_4}G_{g_4}\} \end{bmatrix}^T,$$

and wherein the demodulation unit compares a difference between the reception signal and the transmission signal for each channel through an equation of $$\begin{bmatrix} \bar{s}_1 \\ \bar{s}_2 \\ \bar{s}_3 \\ \bar{s}_4 \end{bmatrix} = \arg\min_{s_1,s_2,s_3,s_4 \in Q} \left\| \begin{array}{c} y - \bar{h}_{\mu,1}s_1 - \bar{h}_{\mu,2}s_2 \\ -\bar{h}_{\mu,3}s_3 - \bar{h}_{\mu,3}s_4 \end{array} \right\|^2$$

$$m_\mu = \min_{s_1,s_2,s_3,s_4 \in Q} \left\| \begin{array}{c} y - \bar{h}_{\mu,1}s_1 - \bar{h}_{\mu,2}s_2 \\ -\bar{h}_{\mu,3}s_3 - \bar{h}_{\mu,3}s_4 \end{array} \right\|^2$$

$$\bar{\mu} = \operatorname*{argmin}_\mu m_\mu$$

to generate reception data on the basis of the demodulation signal and the transmission antenna combination information corresponding to the channel with a small difference.

15. The MIMO communication system using the pre-coder based on the tight frame according to claim 1, wherein the reception device further includes a demapping unit that converts on a symbol-type signal provided from the demodulation unit into bit-type data, and outputs the bit-type data.

16. The MIMO communication system using the pre-coder based on the tight frame according to claim 11, wherein the reception device further includes a demapping unit that converts the symbol-type signal provided from the demodulation unit into bit-type data, and outputs the bit-type data.

* * * * *